(No Model.)

C. AICHELE.
SECURING CRANK ARMS TO SHAFTS.

No. 512,529. Patented Jan. 9, 1894.

Witnesses
F. D. Goodwin
R. Schleicher

Inventor
Christian Aichele
by his Attorneys
Howson & Howson

UNITED STATES PATENT OFFICE.

CHRISTIAN AICHELE, OF PHILADELPHIA, PENNSYLVANIA, ASSIGNOR TO THE NORTH BROTHERS MANUFACTURING COMPANY, OF SAME PLACE.

SECURING CRANK-ARMS TO SHAFTS

SPECIFICATION forming part of Letters Patent No. 512,529, dated January 9, 1894.

Application filed May 22, 1893. Serial No. 475,122. (No model.)

*To all whom it may concern:*

Be it known that I, CHRISTIAN AICHELE, a citizen of the United States, residing in Philadelphia, Pennsylvania, have invented certain Improvements in Securing Crank-Arms to Shafts, of which the following is a specification.

The object of my invention is to provide means whereby a crank arm or handle can be readily secured to or released from a shaft, and this object I attain in the manner hereinafter set forth, reference being had to the accompanying drawings, in which—

Figure 1:
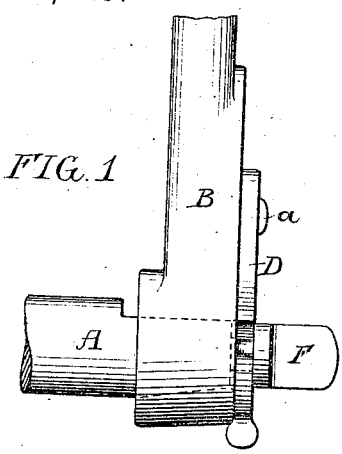
Figure 2:
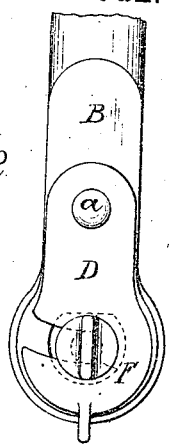
Figure 3:
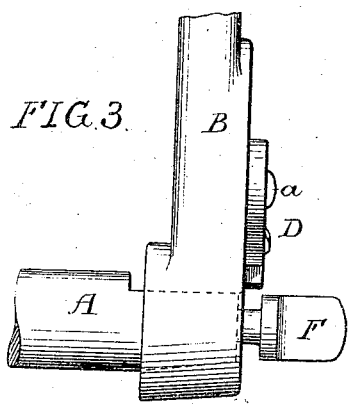
Figure 4:
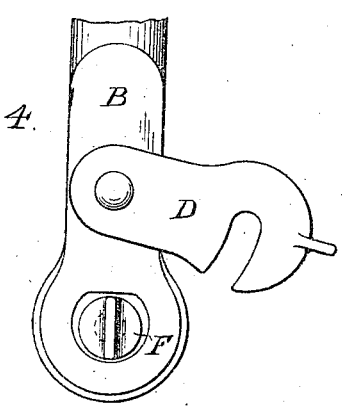
Figure 5:
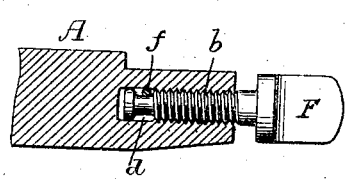
Figure 6:
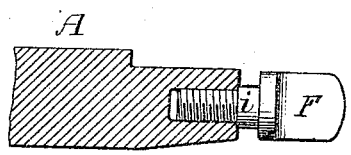
Figure 7:
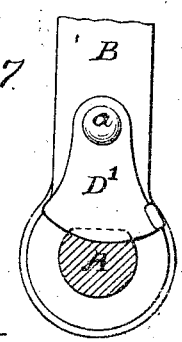
Figure 8:
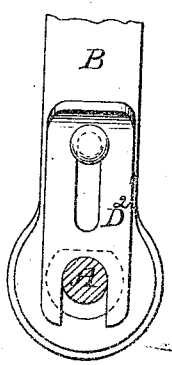

Figure 1, is a side view of part of a shaft and crank arm with securing device therefor constructed in accordance with my invention, the crank arm being secured to the shaft. Fig. 2, is an end view of Fig. 1. Fig. 3, is a view similar to Fig. 1, but showing the crank arm unlocked from the shaft. Fig. 4, is an end view of Fig. 3. Fig. 5, is a sectional view illustrating a minor feature of the invention; and Figs. 6, 7 and 8, are sectional views illustrating modifications of the invention.

A represents part of a shaft and B part of a crank arm or handle applied to the end of the same, the end portion of the shaft being tapered and also flattened at one side and the opening in the crank arm being correspondingly shaped so that the crank arm is prevented from turning independently of the shaft and can only be forced onto the same to a certain definite extent owing to the tapering of the end of the shaft and of the opening in the crank arm. In order to secure the crank arm to the shaft, therefore, it is only necessary to prevent outward movement of said crank arm and it is usual to accomplish this result by means of a thumb screw having a threaded stem adapted to a threaded opening in the end of the shaft and an enlarged head bearing upon the outer face of the crank arm.

In many classes of machines, such as meat cutters, and the like, it is necessary to frequently remove and apply the crank arm at the end of the shaft, and when the thumb screw is employed for retaining the crank in position it is liable to be lost or mislaid, as it must be removed and laid aside before the crank arm can be taken off. In order to overcome this objection I provide the crank arm with a swinging catch D hung to the arm by means of a pin, screw, or rivet $a$ and adapted to engage with the shaft or with a shoulder formed on or carried by said shaft so as to prevent longitudinal movement of the crank arm on the shaft.

In the construction shown in Figs. 1 to 5 the shaft carries a thumb screw F having a threaded stem $b$, which is adapted to a threaded opening in the end of the shaft and is preferably grooved as shown at $d$, Fig. 5, for the reception of a transverse pin $f$, so that while the screw can be backed off slightly, it cannot be removed and laid aside, although even without this provision there is little chance of the screw being misplaced, as it is never necessary to remove the same in order to release the crank arm, for the head of the thumb screw is less in diameter than the opening in the crank, so that when the pivoted catch D is swung back, as shown in Figs. 3 and 4, the crank arm can be readily slipped off over the head of the screw, but when the catch is swung down between the outer face of the crank arm and the shoulder formed by the head of the thumb screw, as shown in Figs. 1 and 2, longitudinal movement of the crank arm is effectually prevented.

The retaining screw may, if desired, be screwed up to a shoulder $i$, as shown in Fig. 6, and may remain permanently in position so as to form a groove for the reception of the swinging catch and a shoulder constituting the outer bearing for said catch, or such groove may be formed directly in the shaft or the catch may simply bear upon a curved or other seat formed upon the projecting end of the shaft, as shown for instance at D' in Fig. 7, the faces of the catch and seat in this case being, by preference, slightly eccentric, one in respect to the other, so that the catch can be jammed so tightly against the seat as to prevent accidental displacement and preclude the slipping of the crank arm outward on the shaft. A sliding catch may also be substituted for the swinging catch if desired, as shown for instance at $D^2$ in Fig. 8, although the swinging catch is preferred.

Having thus described my invention, I claim and desire to secure by Letters Patent—

1. The combination of the crank handle, a shaft having a tapering seat for the same and having also beyond said crank handle a contracted neck and an outer shoulder, said shouldered portion being less in size than the opening in the crank handle, means for preventing turning of the handle on the shaft, and a catch mounted upon the outer face of the crank handle and movable into and out of the recess formed by the contracted neck and outer shoulder of the shaft so as to confine or release the crank handle, substantially as specified.

2. The combination of the shaft, a crank arm or handle adapted to said shaft, but incapable of turning thereon, a movable catch mounted on the outer face of the crank arm, and a thumb screw adapted to an opening in the end of the shaft and having a head less in diameter than the opening of the crank arm, said head serving by contact with the movable catch on the crank arm to retain the latter longitudinally on the shaft, substantially as specified.

3. The combination of the shaft, the crank arm or handle adapted to fit tightly on said shaft and incapable of turning thereon, a movable catch mounted on the outer face of the crank arm, a thumb screw adapted to a threaded opening in the end of the shaft and having a head bearing upon said catch but less in diameter than the opening in the crank arm, and means for preventing the detaching of said thumb screw from the shaft but permitting a slight turning movement of the same, substantially as specified.

In testimony whereof I have signed my name to this specification in the presence of two subscribing witnesses.

CHRISTIAN AICHELE.

Witnesses:
R. H. NORTH,
WM. H. MACMUNN.